(12) United States Patent
Neet et al.

(10) Patent No.: US 8,151,447 B2
(45) Date of Patent: Apr. 10, 2012

(54) APPARATUS FOR LOADING STATOR WINDINGS INTO A STATOR CORE

(75) Inventors: Kirk Neet, Pendleton, IN (US); Jeremiah Shives, Noblesville (IN)

(73) Assignee: Remy Technologies, L.L.C., Pendleton, IN (US)

( * ) Notice: Subject to any disclaimer, the term of this patent is extended or adjusted under 35 U.S.C. 154(b) by 181 days.

(21) Appl. No.: 12/685,966

(22) Filed: Jan. 12, 2010

(65) Prior Publication Data

US 2011/0167622 A1 Jul. 14, 2011

(51) Int. Cl.
*B23P 19/00* (2006.01)
*H02K 15/00* (2006.01)

(52) U.S. Cl. ............... 29/732; 29/596; 29/734; 29/736; 29/792; 29/605

(58) Field of Classification Search ............ 29/596–598, 29/732–738, 605, 606; 414/27, 788; 242/440.1; 140/92.1
See application file for complete search history.

(56) References Cited

U.S. PATENT DOCUMENTS

| | | | | | |
|---|---|---|---|---|---|
| 3,672,026 | A | * | 6/1972 | Cutler et al. | 29/732 |
| 4,079,512 | A | * | 3/1978 | Lakes | 29/732 |
| 4,449,289 | A | * | 5/1984 | Kindig | 29/732 |
| 6,006,417 | A | * | 12/1999 | Brown et al. | 29/596 |
| 2011/0167622 | A1 | * | 7/2011 | Neet et al. | 29/596 |

* cited by examiner

*Primary Examiner* — Minh Trinh
(74) *Attorney, Agent, or Firm* — Cantor Colburn LLP

(57) ABSTRACT

An apparatus for loading stator windings into a stator core includes an arbor member including a body having a central axis and an outer diametric portion provided with a plurality of slots. An insertion element is rotatably mounted adjacent the arbor member. The insertion element includes a plurality of slot elements that are configured to register with the plurality of slots. A loading member is rotatably mounted adjacent the insertion element. The loading member includes a plurality of slot members that are configured to register with the plurality of slot elements. The loading member is selectively operated to receive a stator winding into one of the plurality of slot members and transfer the stator winding into one of the plurality of slot elements. The at least one insertion element is selectively operated to transfer the stator winding into one of the plurality of slots of the arbor member.

10 Claims, 8 Drawing Sheets

APPARATUS FOR LOADING STATOR WINDINGS INTO A STATOR CORE

BACKGROUND OF THE INVENTION

Exemplary embodiments pertain to the art of electrical machines and, more particularly, to a method and apparatus for loading stator windings into a stator core.

Electrical machines, such as alternating current electric generators include a stator assembly and a rotor assembly arranged in a housing. The stator assembly is mounted to the housing and includes a generally cylindrical stator core provided with a plurality of slots. Conductors or stator windings are fitted into the plurality of slots in a predetermined pattern. The stator windings are formed of slot segments that are located in select ones of the plurality of slots to form a multi-phase winding pattern. The rotor assembly includes a rotor attached to a shaft that is rotatably mounted to the housing coaxially with the stator core. The rotor is rotated within the stator core to develop an electrical current.

Inserting the stator windings into the plurality of slots is a complex task. In some arrangements, a winding needle lays a wire into one of the plurality of slots before advancing and laying the wire into another of the plurality of slots. This process continues until the stator core is wound and each of the plurality of slots is filled. At this point, the wire is cut to form multiple phases. In other arrangements, a wire is preformed with slot segments interconnected by end loops. The slot segments are spaced so as to be inserted into select ones of the plurality of slots in a predetermined pattern. The wire is then loaded directly into the stator core with the slot segments being inserted into the select ones of the plurality of slots. Once the wire is loaded into the stator core, another wire is prepared and loaded in a similar manner. This process continues, each wire being inserted individually into the stator core, until a multi-phase pattern is complete. In still other arrangements, the wire is formed, transferred to a receiver having a plurality of slots, and loaded into corresponding slots provided in a transfer tool. With this arrangement, each wire that makes up one of the multiple-phases is formed, individually transferred to the slots in the receiver and individually transferred from the slots in the receiver to the slots in the transfer tool. Once filled, the transfer tool is inserted into the stator core and the wires are loaded into the plurality of slots.

BRIEF DESCRIPTION OF THE INVENTION

Disclosed is an apparatus for loading stator windings into a stator core. The apparatus includes an arbor member including a body having a central axis and an outer diametric portion provided with a plurality of slots. At least one insertion element is rotatably mounted adjacent the outer diametric portion of the arbor member. The at least one insertion element includes an outer diametric section provided with a plurality of slot elements that are configured and disposed to register with the plurality of slots. At least one loading member is rotatably mounted adjacent the outer diametric section of the at least one insertion element. The at least one loading member includes an outer diametric region provided with a plurality of slot members that are configured and disposed to register with the plurality of slot elements of the at least one insertion element. The at least one loading member is selectively operated to receive a stator winding into one of the plurality of slot members and transfer the stator winding into one of the plurality of slot elements of the at least one insertion element. The at least one insertion element is selectively operated to transfer the stator winding into one of the plurality of slots of the arbor member.

Also disclosed is a method of loading stator windings into an arbor member. The method includes rotating a loading member including a plurality of slot member, guiding a stator winding into one of the plurality of slot members provided on the loading member, rotating an insertion element including a plurality of slot elements relative to the loading member, transferring the stator winding from the one of the plurality of slot members into one of the plurality of slot elements provided on the insertion element, and leading the stator winding from the one of the plurality of slot elements into one of a plurality of slots provided in the arbor member.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
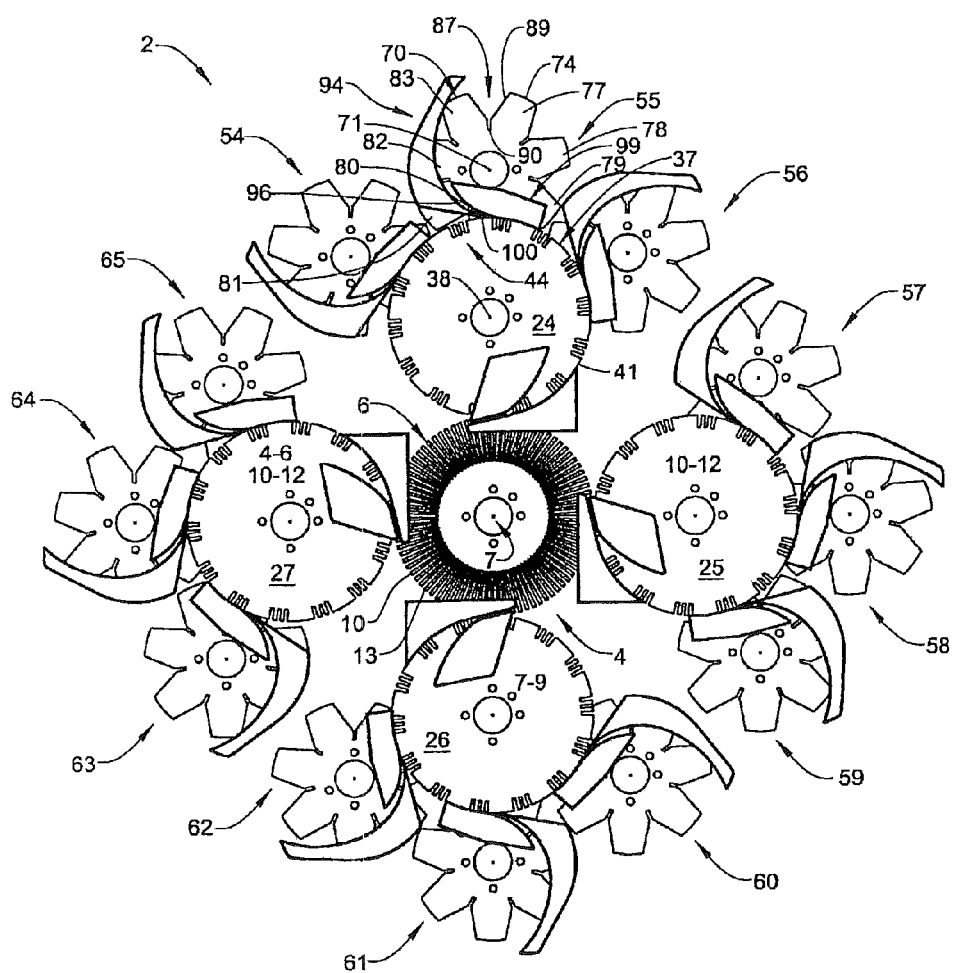
FIG. 1 depicts an apparatus for loading stator windings into a stator core in accordance with an exemplary embodiment.

Referencing FIG. 1, an apparatus for loading stator windings into a store core is indicated generally at 2. Apparatus 2 includes an arbor member 4 having a body 6 including a central axis 7. Body 6 includes an outer diametric portion 10 including a plurality of slots, one of which is indicated at 13. In the embodiment shown, arbor member 4 includes 84 slots that define 14 poles for 6 phases. However, it should be understood, that the particular number of slots in arbor member 4 can vary depending on the particular type of stator core being employed. Apparatus 2 further includes a plurality of insertion elements 24-27 that are arrayed about outer diametric portion 10 of arbor member 4. As each insertion element is substantially similar, a detailed description will follow with respect to insertion element 24 with an understanding that insertion elements 25-27 are similarly formed.

Insertion element 24 includes a body member 37 having a central axis 38. Body member 37 includes an outer diametric section 41 provided with a plurality of slot elements such as indicated generally at 44. In the exemplary embodiment shown, the plurality of slot elements 44 are arranged in groups of three (3) slots (not separately labeled) spaced evenly about outer diametric section 41. As further shown in FIG. 1, outer diametric section 41 is positioned directly adjacent to outer diametric portion 10 to facilitate the transfer of stator windings from insertion element 25 into arbor member 4 in a manner that will be detailed more fully below.

As further shown in FIG. 1, apparatus 2 includes a plurality of loading members 54-65. Loading members are arrayed in groups of three (3) about each insertion element 24-27. More specifically, loading members 54, 55 and 56 are arrayed about insertion element 24, loading members 57-59 are arrayed about insertion element 25, loading members 60-62 are arrayed about insertion element 26, and loading members 63-65 are arrayed about insertion element 27. As each loading member 54-65 is similarly formed, a detailed description will follow referencing loading member 55, with an understanding that the remaining loading members 54 and 56-65 are similarly formed.

Loading member 55 includes a body element 70 having a central axis 71 and an outer diametric region 74 that is defined by a plurality of loading fingers 77-83. Loading member 55 further includes a plurality of slot members, one of which is indicated at 87, positioned between adjacent ones of loading fingers 77-83. In accordance with the exemplary embodiment shown, each slot member 87 includes a first end portion 89 that extends to a second end portion 90. More specifically, first end portion 89 includes a first width, while second end portion 90 includes a second width that is significantly smaller than the first width. With this arrangement, slot segments of stator windings are readily received within first end portion 89. That is, first end portion 89 that acts as receiving portion that accepts and guides each slot segment toward second end portion 90. The slot segments are then transferred from second end portion 90 to one of the plurality of slot elements 44 on insertion element 24 in a manner that will be detailed more fully below.

Apparatus 2 further includes a guide element 94 positioned adjacent loading member 55 and a corresponding one of insertion elements 24. As will be detailed more fully below, guide element 94 includes a guide surface 96 that is configured to locate a segment of a stator winding within a corresponding one of slot members 87. In addition to guide element 94, apparatus 2 includes a guide member 99 that is similarly positioned between loading member 55 and insertion elements 24. Guide member 99 includes a guide zone 100 that is configured to cooperate with guide surface 96 to position slot segments within a corresponding one of slot elements 44. Although not shown for sake of simplicity of the drawings, it should be understood that a guide element and corresponding guide member are positioned between each loading member 54-65 and a respective insertion element 24-27.

Reference will now be made to FIGS. 2-6 in describing a method of loading insertion element 24 with stator windings in accordance with the exemplary embodiment. At this point, it should be understood that each loading member 54-56 receives a slot segment associated with a corresponding stator winding for transfer into insertion element 24. More specifically, loading member 54 will receive and transfer a slot element into the left most one of a group of 3 slot elements 44, loading member 55 will receive and transfer a slot segment into a central one of the group of three (3) slot elements 44 and loading member 56 will receive and transfer a slot segment into a right most one of the group of three (3) slot elements 44. However, for sake of simplicity of the figures, a detailed description will follow describing the operation of loading member 55.

Figure 2:
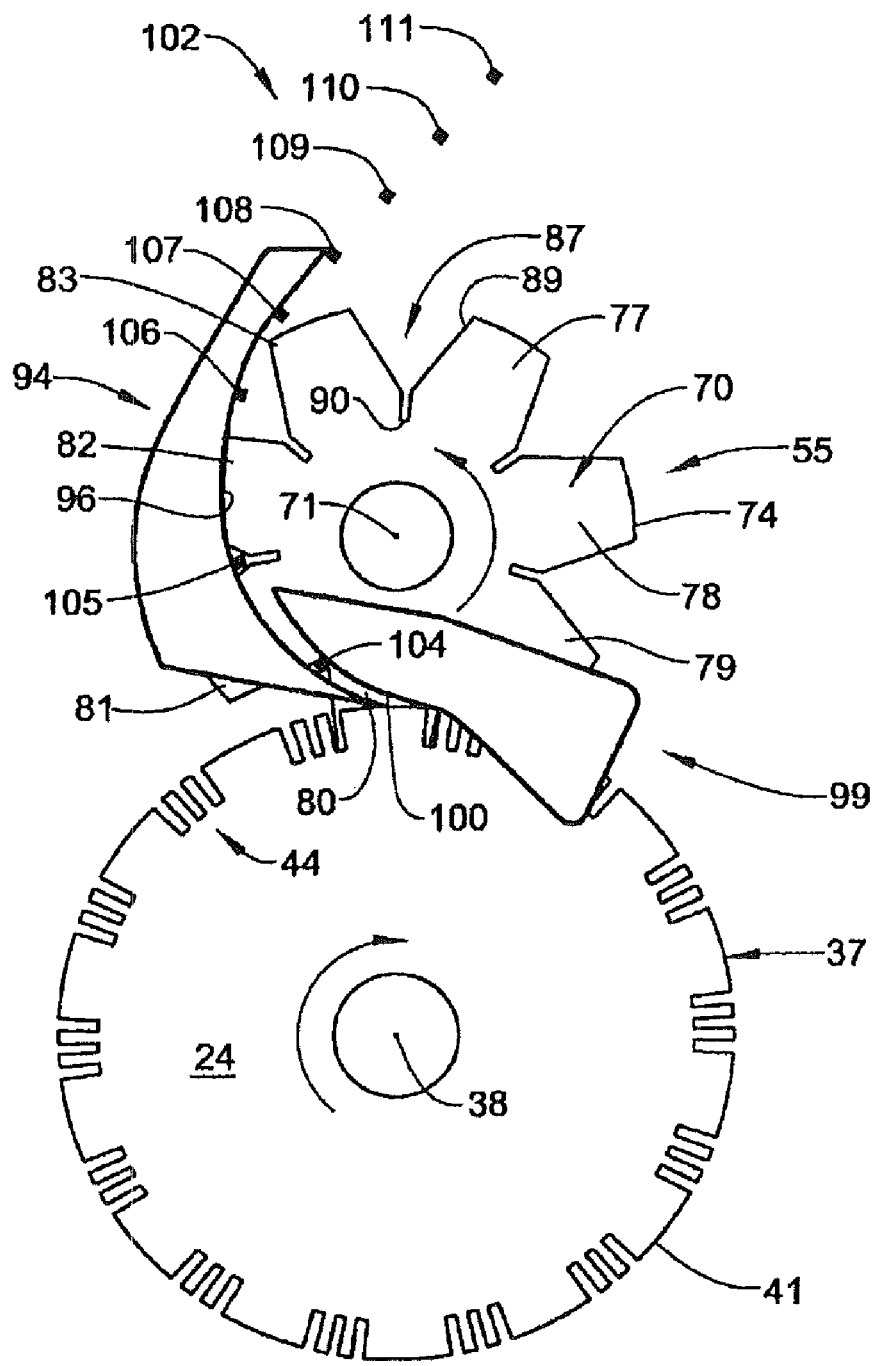
FIG. 2 depicts a loading member in a first position receiving a stator winding in accordance with the exemplary embodiment.
Figure 3:
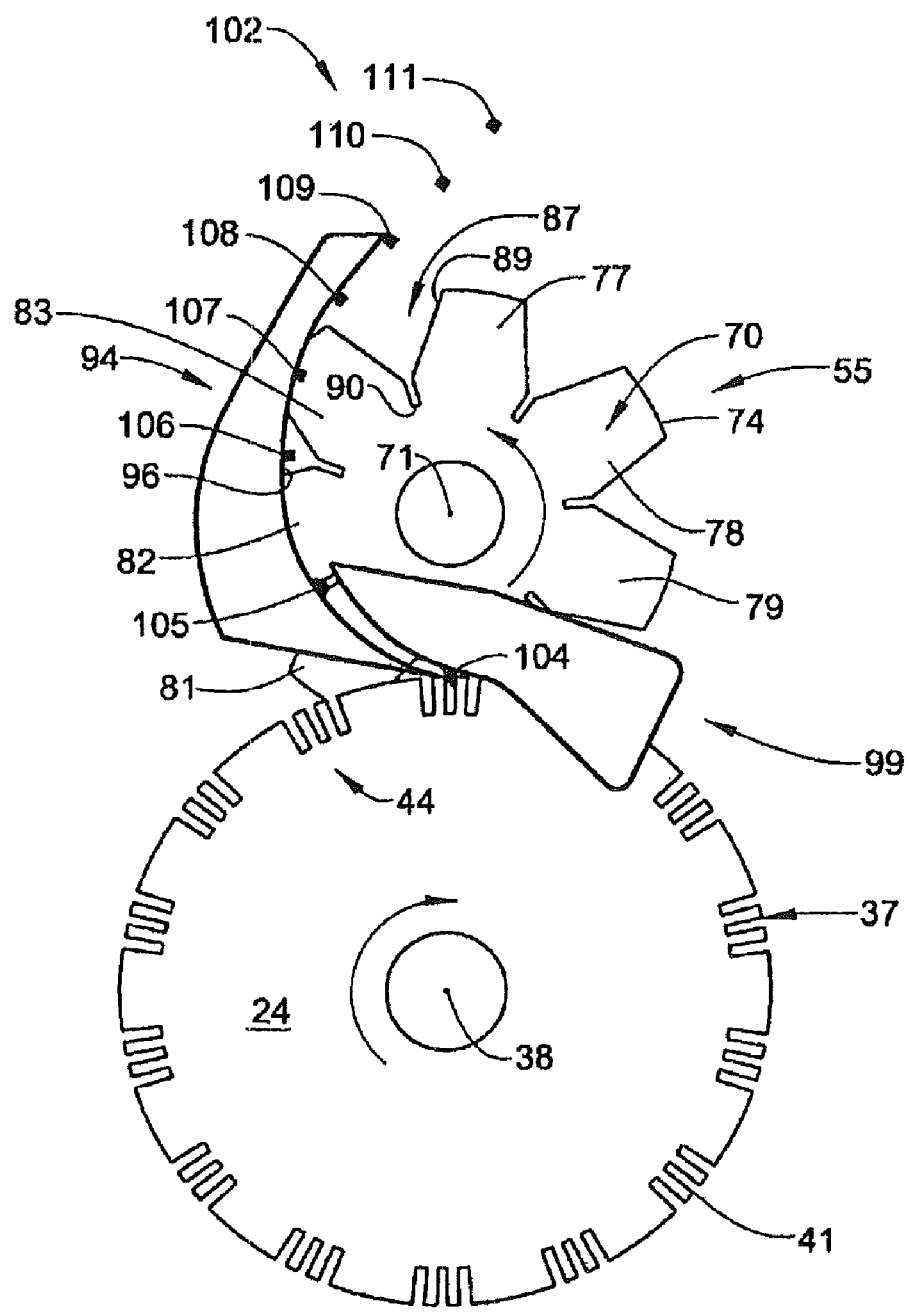
FIG. 3 depicts the loading member of FIG. 2 moving the stator winding toward a slot on an insertion element in accordance with the exemplary embodiment.
Figure 4:
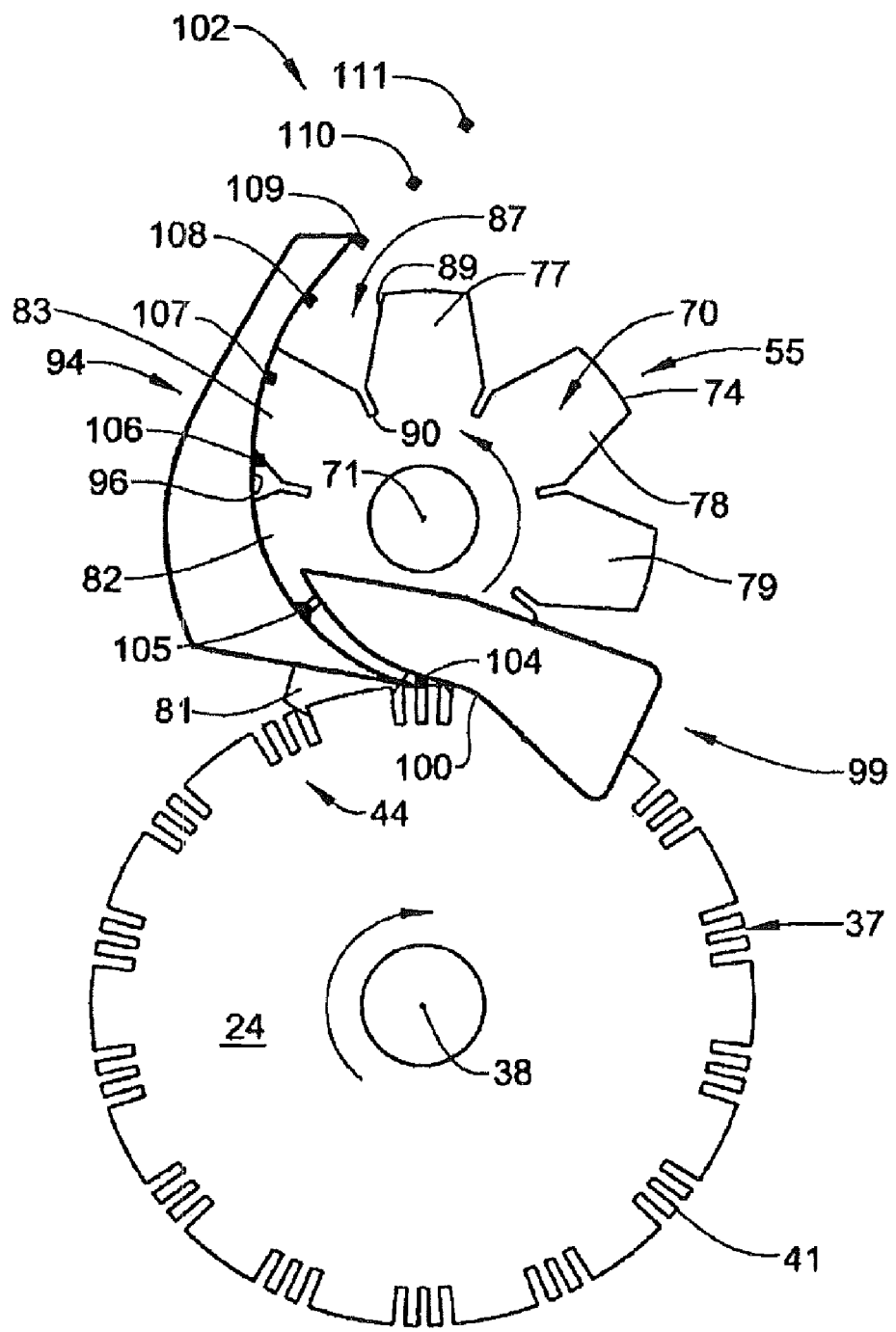
FIG. 4 depicts the loading member of FIG. 3 moving the stator winding to a position adjacent the slot on the insertion element.
Figure 5:
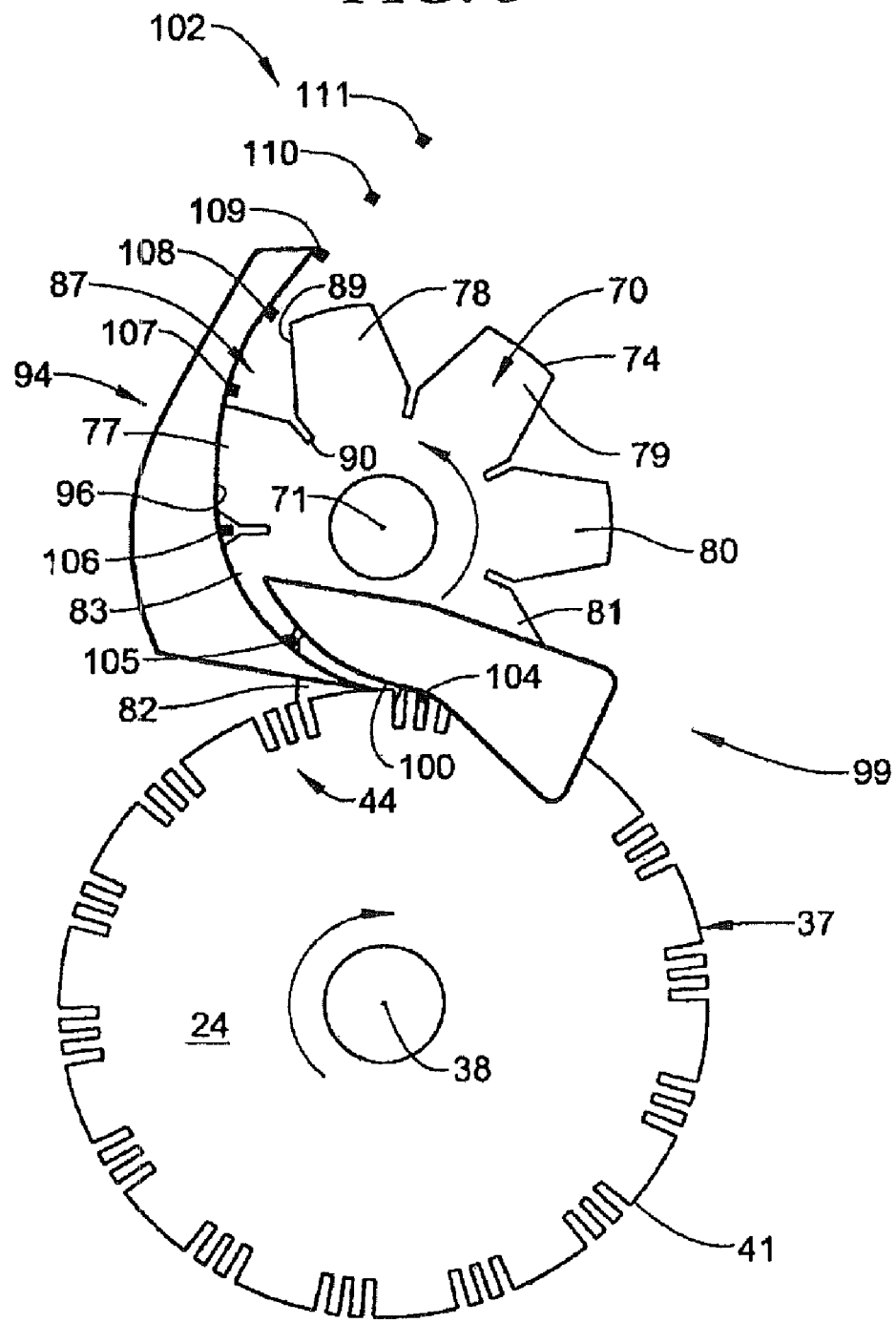
FIG. 5 depicts a guide component transferring the stator winding from the loading member into the slot on the insertion element.
Figure 6:
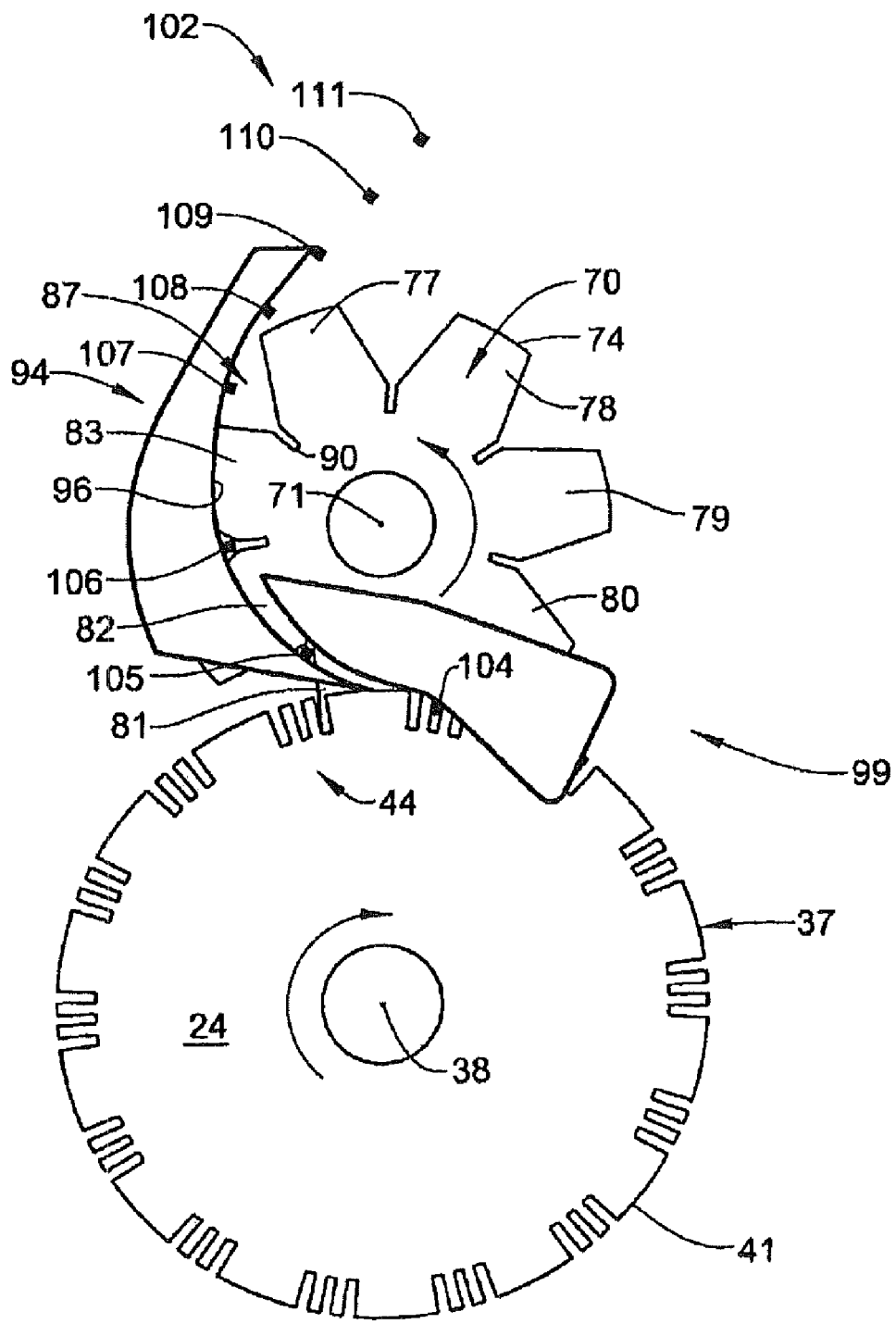
FIG. 6 depicts the guide component of FIG. 5 moving the stator winding deeper into the slot on the insertion element.

As best shown in FIG. 2, a stator winding 102 having a plurality of slot segments 104-111 is fed into guide element 94. Slot segments 104-111 transition along guide surface 96 and are positioned within corresponding ones of slots 87. Loading member 55 continues to rotate urging slot segments 104-111 along guide surface 96 towards second end 90 of each slot member 87. Slot segments 104-111 move along guide surface 96 towards a terminal end (not separately labeled) of guide element 94. At this point, a slot segment, for example, slot segment 104, contacts guide zone 100 on guide member 99 as shown in FIG. 3. Guide zone 100 positions slot segment 104 at a corresponding one of slot elements 44 such as shown in FIG. 4. Further rotation of loading member 55 urges slot segment 104 into the one of slot elements 44 as shown in FIG. 5. Continued rotation of loading member 55 and counter rotation of insertion element 24 causes slot segment 104 to move further into the corresponding one of the plurality of slot elements 44 such as shown in FIG. 6. With this arrangement, the continued rotation of loading member 55 and counter rotation of insertion element 24 positions a corresponding one of slot members 104-111 into a central one of the group of three (3) slots for each of the plurality of slot elements 44. That is, loading member 55 and insertion element 24 are timed to ensure that a slot segment is fed into the central one of each group of three (3) slot elements 44.

Figure 7:
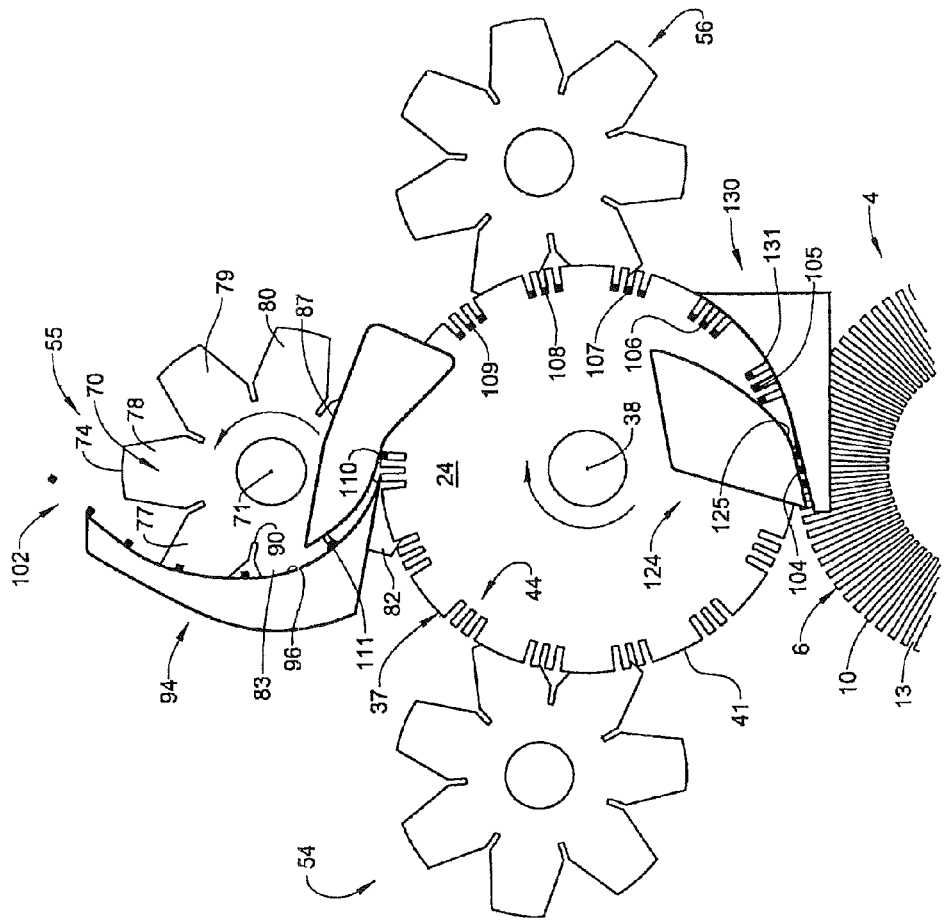
FIG. 7 depicts the insertion element of FIG. 6 moving the stator winding into an arbor member in accordance with the exemplary embodiment.
Figure 8:
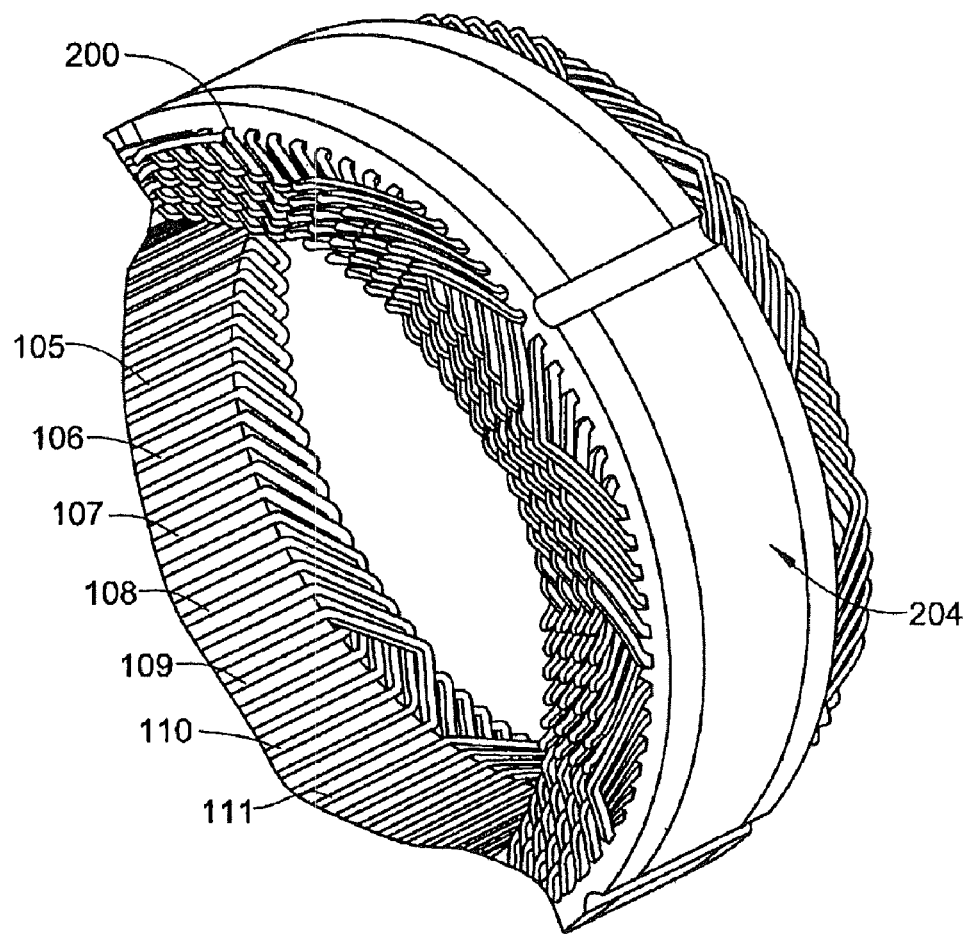
FIG. 8 is a partial perspective view of a stator following insertion of the stator winding from the apparatus of FIG. 1.

Reference will now be made to FIG. 7 in describing a method of transferring the slot segment(s) from slot elements 44 into arbor member 4. As shown, the slot segments travel with insertion element 24 in groups of three (3). As the slot segments near arbor member 4, a guide component 124 urges the plurality of slot segments from the corresponding ones slot elements 44 into respective ones of the plurality of slots 13 in arbor member 4. More specifically, guide component 124 includes an arcuate surface 125 having a generally concave shape that acts as a ramp guiding slot segments from insertion element 24 toward arbor member 4. In addition, apparatus 2 is shown to include a guide constituent 130 having an arcuate surface 131 having a generally convex shape that cooperates with guide component 124 in positioning the slot segments into the plurality of slots 13 of arbor member 4. In this manner, insertion element 24 cooperates with the remaining insertion elements 25-27 in filling the plurality of slots 13 of arbor member 4 with a predetermined number of stator windings. For example, each slot 44 is filled with three (3) slot segments. Once filled, arbor member 4 is inserted into a central portion of a stator core and the stator windings are urged outward from slots 13 into a corresponding plurality of slots, one of which is indicated at 200, on a stator core 204 such as shown in FIG. 8.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An apparatus for loading stator windings into a stator core, the apparatus comprising:

an arbor member including a body having a central axis and an outer diametric portion provided with a plurality of slots;

at least one insertion element rotatably mounted adjacent the outer diametric portion of the arbor member, the at least one insertion element including an outer diametric section provided with a plurality of slot elements that are configured and disposed to register with the plurality of slots; and at least one loading member rotatably mounted adjacent the outer diametric section of the at least one insertion element, the at least one loading member including an outer diametric region provided with a plurality of slot members that are configured and disposed to register with the plurality of slot elements of the at least one insertion element, wherein the at least one loading member is selectively operated to receive a stator winding into one of the plurality of slot members and transfer the stator winding into one of the plurality of slot elements of the at least one insertion element, the at least one insertion element being selectively operated to transfer the stator winding into one of the plurality of slots of the arbor member.

2. The apparatus according to claim 1, wherein each of the plurality of slot members includes a first end portion having a first width and a second end portion having a second width, the first width being greater that the first width to facilitate the transfer of stator windings into the at least one loading member.

3. The apparatus according to claim 1, further comprising: a guide member positioned between the at least one loading member and the at least one insertion element, the guide member being configured and disposed to urge the stator winding from the one of the plurality of slot members of the at least one loading member into the one of the plurality of slot elements of the at least one insertion element.

4. The apparatus according to claim 3, further comprising: a guide element positioned adjacent the at least one loading member, the guide element including a guide surface that is configured and disposed to urge the stator winding into the first end portion of one of the plurality of slot members.

5. The apparatus according to claim 1, further comprising: a guide component positioned between the insertion element and the arbor member, the guide component being configured and disposed to lead the stator winding from the one of the plurality of slot elements into the one of the plurality of slots.

6. The apparatus according to claim 5, further comprising: a guide constituent positioned adjacent the guide component, the guide constituent being configured and disposed to cooperate with the guide component to lead the stator winding from the one of the plurality of slot elements into the one of the plurality of slots.

7. The apparatus according to claim 1, wherein the at least one loading member includes three loading members positioned about the outer diametric section of the at least one insertion element.

8. The apparatus according to claim 7, wherein the at least one insertion element includes four insertion elements arrayed about the outer diametric portion of the arbor member.

9. The apparatus of claim 1, wherein the outer diametric region of the at least one loading member overlaps the outer diametric section of the at least one insertion element.

10. The apparatus of claim 1, wherein the outer diametric section of the at least one insertion element is directly adjacent the outer diametric portion of the arbor member.

* * * * *